US008004393B2

(12) United States Patent
Haber

(10) Patent No.: US 8,004,393 B2
(45) Date of Patent: Aug. 23, 2011

(54) DIGITAL VEHICLE CARGO SECURITY SYSTEM

(75) Inventor: Greg Haber, Woodbury, NY (US)

(73) Assignee: Babaco Alarm Systems, Inc., Moonachie, NJ (US)

( * ) Notice: Subject to any disclaimer, the term of this patent is extended or adjusted under 35 U.S.C. 154(b) by 502 days.

(21) Appl. No.: 12/214,723

(22) Filed: Jun. 20, 2008

(65) Prior Publication Data

US 2009/0002143 A1 Jan. 1, 2009

Related U.S. Application Data

(60) Provisional application No. 60/937,363, filed on Jun. 26, 2007.

(51) Int. Cl.
*B60R 25/10* (2006.01)

(52) U.S. Cl. .................................................. 340/426.28

(58) Field of Classification Search ............. 340/426.23, 340/542, 5.2, 426.28, 547, 545.6, 539.1; 235/382

See application file for complete search history.

(56) References Cited

U.S. PATENT DOCUMENTS 3,792,493 A 2/1974 Hughes
4,750,197 A 6/1988 Denekamp et al.
4,766,419 A * 8/1988 Hayward .................. 340/545.2
5,063,764 A * 11/1991 Amis et al. ...................... 70/100
5,097,253 A 3/1992 Eschbach et al.
5,640,139 A 6/1997 Egeberg
5,729,199 A 3/1998 Cooper et al.
6,249,224 B1 6/2001 Shoen et al.
6,317,025 B1 11/2001 Leon et al.
6,933,844 B2 * 8/2005 Augspurger et al. ...... 340/545.1
6,995,669 B2 * 2/2006 Morales .................. 340/539.31
7,066,500 B2 6/2006 Haber
7,068,162 B2 6/2006 Maple et al.
7,501,946 B2 * 3/2009 Lanigan et al. ........... 340/545.6

* cited by examiner

*Primary Examiner* — Phung Nguyen

(74) *Attorney, Agent, or Firm* — Robert L. Epstein; Epstein Drangel LLP

(57) ABSTRACT

The security system determines if the cargo area of a vehicle may have been opened in transit between a loading location and a destination location. The vehicle has an enclosed cargo area with a cargo door and lock. The system includes a digital counter which displays a number set thereon after the cargo area has been secured by locking the cargo door lock or by closing the cargo door. If a magnetic reed switch senses the unlocking of the cargo door lock or the opening of the cargo door after the cargo area has been secured, it causes the number on the counter to change. The set number is forwarded to the destination location by entering it on the shipping documents or transmitting it electronically. At the destination location, it can be determined if the cargo area may have been accessed in transit by comparing the set number forwarded to the recipient by the shipper with the number displayed on the counter when the vehicle reaches the destination location.

27 Claims, 7 Drawing Sheets

Fig. 1
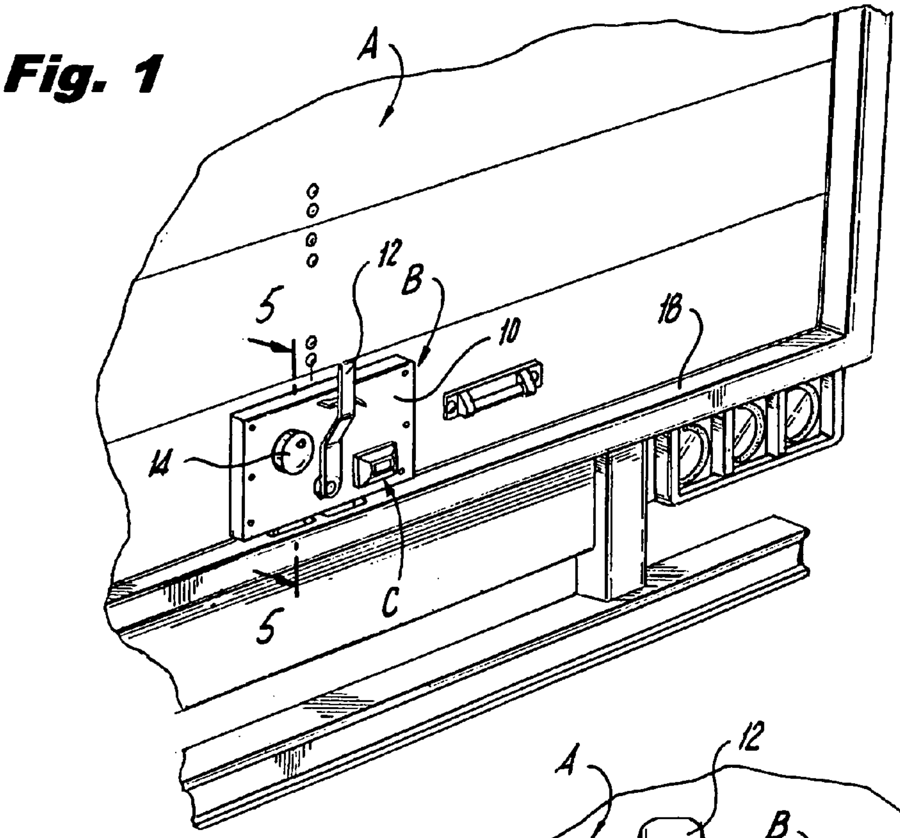
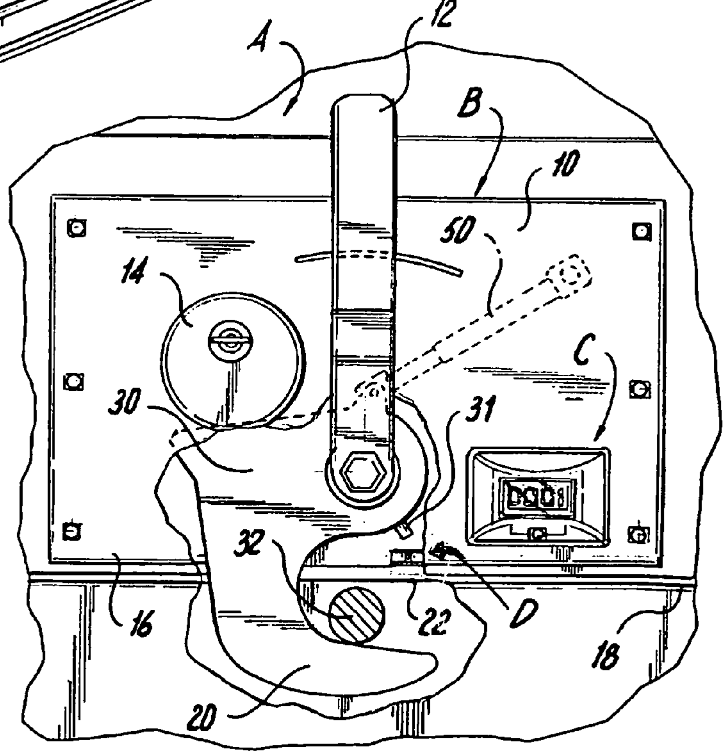
Fig. 2

DIGITAL VEHICLE CARGO SECURITY SYSTEM

CROSS-REFERENCE TO RELATED APPLICATIONS

Priority is claimed on Provisional Patent application Ser. No. 60/937,363 filed Jun. 26, 2007.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to cargo security systems, and more particularly to a security system for the protection of cargo located in a truck or similar vehicle during transport in which a digital counter display device is mounted on the exterior truck cargo door or cargo door lock enclosure and displays a number which changes upon opening of the cargo door or lock to indicate that the vehicle cargo area may have been accessed during transit.

2. Description of Prior Art including Information Disclosed Under 37 CFR 1.97 and 1.98

Currently, it is very common for trucks used to transport cargo to utilize a plastic or metal seal attached to the J-hook of the lock of a truck door. The physical seal is attached to the lock by the shipper after the truck is loaded with cargo and the door has been locked, before the truck leaves the shipper to travel to its destination.

In order to open the truck door and access the cargo, it is necessary to break the seal. Hence, the physical seal acts as a visual indicator as to whether the vehicle door has been opened during transit. At the destination, the recipient observes the physical seal when the truck arrives, before the vehicle door is opened. If the seal remains intact, the recipient knows that the vehicle door has not been opened and thus the cargo has not been tampered with during transit. If the seal is broken, the recipient knows that the vehicle door has been opened permitting access to the cargo and thus not to accept the shipment.

However, the physical seal has disadvantages. The seal may be damaged or broken for reasons other than accessing the cargo, causing the shipper to refuse the shipment even though the cargo has not been tampered. Further, it is difficult for the shipper to lock the vehicle door and at the same time place a seal on the lock because the seal must be attached to the J-hook of the lock, the part that is received in the door jam to secure the door.

BRIEF SUMMARY OF THE INVENTION

It is, therefore, a prime object of the present invention to provide a digital vehicle cargo security system.

It is another object of the present invention to provide a digital vehicle cargo security system that utilizes a digital counter to indicate that the truck cargo may have been accessed during transit.

It is another object of the present invention to provide a digital vehicle cargo security system in which the number on the counter after the cargo has been secured is transmitted to the recipient of the cargo at the cargo destination.

It is another object of the present invention to provide a digital vehicle cargo security system in which the number on the counter is transmitted to the cargo recipient by entering the number on the shipping documents or electronically, via the Internet or by a wireless communications device.

It is another object of the present invention to provide a digital vehicle cargo security system which in one embodiment includes a sensor located within the enclosure of the truck door lock capable of sensing the state of the lock.

It is another object of the present invention to provide a digital vehicle cargo security system which in another embodiment includes a sensor located adjacent the cargo door capable of sensing the position of the cargo door.

It is another object of the present invention to provide a digital vehicle cargo security system in which the sensor is a magnetic switch.

It is another object of the present invention to provide a digital vehicle cargo security system wherein the digital display is permanently attached to the exterior of the vehicle door or to the exterior surface of the enclosure of the vehicle door lock.

It is another object of the present invention to provide a digital vehicle cargo security system wherein no part of the invention is mounted on the J-hook of the vehicle lock and hence cannot interfere with the locking thereof.

The display device of the present invention takes the form of a digital counter. The counter is connected to a sensor, such as a magnetic reed switch, which senses the opening of the truck cargo door or the unlocking of the cargo door lock. The sensor actuates the counter, changing the number on the display, indicating that the cargo area may have been accessed and thus the cargo may have been tampered with during transit.

When the shipper closes and locks the vehicle door, the number on the display is noted. That number is recorded by the shipper and forwarded to the recipient, for example, by entering the noted number on the shipping documents or sending it electronically, such as by fax e-mail or via a wireless communications device, to the recipient.

When the recipient of the cargo inspects the truck upon arrival at the destination, the number on the counter is observed. If the number on the counter is the same as the number transmitted by the shipper, the recipient knows that the cargo could not have been accessed during transit and the cargo has not been tampered with. The shipper can then accept the cargo.

However, if the number on the display is different from that transmitted by the shipper, the recipient knows that the cargo door may have been opened during transit and that the cargo may have been tampered with. In that case, the recipient may refuse the shipment or is alerted to inspect the cargo carefully before accepting the shipment.

In accordance with one aspect of the present invention, a method is provided for determining if the cargo in a vehicle may have been accessed during transit between a first location and a second location. The vehicle is of the type having an enclosed cargo area which can be secured preventing access thereto. The vehicle is equipped with a digital counter having a display, means for setting the number on the counter, means for sensing whether the cargo area may have been accessed and for changing the number on the counter in response thereto. The method includes the steps of:

(a) loading cargo into the vehicle cargo area with the vehicle at the first location,
(b) securing the cargo area of the vehicle;
(c) setting the number on the counter after the cargo is secured;
(d) forwarding the set number to the second location;
(e) changing the number on the counter if the cargo area may have been accessed;
(f) moving the vehicle to the second location;
(g) observing the number on the display when the vehicle reaches the second location;
(h) comparing the forwarded number and the observed number; and
(i) determining whether the forwarded number and the observed number are the same or different.

The vehicle has a cargo area door which can be closed to secure the cargo area. The step of securing the cargo area includes the step of closing the cargo area door. In that case, the method further includes the step of changing the number on the counter display if the cargo door has been opened during transit.

The vehicle has a cargo area door with a cargo door lock which can be locked to secure the cargo area. The step of securing the cargo area includes the step of locking the cargo door lock. In that case, the method further includes the step of changing the number on the counter display if the cargo door lock has been unlocked during transit.

The step of forwarding the set number includes the step of entering the set number on the shipping documents. The shipping documents with the entered number may be carried by the vehicle to the second location.

The step of forwarding the set number may include the step of transmitting the set number to the second location separately from the vehicle. The set number may be transmitted to the second location electronically, by fax, using the Internet or a wireless communications device.

The method may include the step of fixing the display to the exterior of the vehicle or to the exterior of the cargo door lock enclosure.

The sensor may take the form of a magnetic switch. In that case, the method includes the step of changing the number on the counter display when the magnetic switch senses that the cargo area may have been accessed.

The digital counter may be connected to a random number generator. In that case, the step of setting the on the counter may include the step of actuating the random number generator to generate a number for display on the counter before the vehicle leaves the first location.

In accordance with another aspect of the present invention, apparatus for determining the cargo area of a vehicle may have been accessed during transit between a first location and a second location is provided. The vehicle is of the type having an enclosed cargo area that can be secured. The apparatus includes: a digital counter having a display; means for setting the number on the counter after the cargo area is secured, means for sensing whether the cargo area may have been accessed after the cargo area has been secured and for changing the number on the counter in response thereto; and means for forwarding the number set on the display to the second location, so that it can be determined at the second location if the cargo may have been accessed during transit between the first location and the second location by comparing the set number and the number on the counter, when the vehicle reaches the second location.

The vehicle cargo area has a door which is closed prior to the vehicle leaving the first location. The system further including means for sensing whether the cargo door has been opened after the number on the counter display has been set, and in response thereto, actuating the number changing means.

The vehicle cargo area has a door with a lock which is locked prior to the vehicle leaving the first location. The system further including means for sensing whether the cargo door lock has been unlocked after the number on the counter display has been set, and in response thereto, actuating the number changing means.

The forwarding means may include shipping documents with the set number entered thereon.

The forwarding means may also include means for transmitting the set number electronically, such as by the Internet or by a wireless communications device.

The apparatus further includes means for fixing the counter to the exterior of the truck or the cargo door lock enclosure.

The counter display is situated in weatherproof enclosure.

The sensing means comprises a switch. The switch preferably takes the form of a magnetic switch.

The cargo door lock has an enclosure. The switch is preferably situated within the lock enclosure. The counter display is preferably situated on the exterior of the lock enclosure.

BRIEF DESCRIPTION OF THE SEVERAL VIEWS OF DRAWINGS

To these and to such other objects that may hereinafter appears, the present invention relates to a digital vehicle cargo security system as described in detail in the following specification and recited in the annexed claims, taken together with the accompanying drawings, in which like numerals refer to like parts and in which:

FIG. 1 is a partial view of the exterior of a vehicle cargo door showing the digital display unit mounted on the exterior of the vehicle cargo door lock enclosure;

FIG. 2 is an elevation view of the vehicle cargo door lock showing the lock in the locked position;

DETAILED DESCRIPTION OF THE INVENTION

Figure 3:
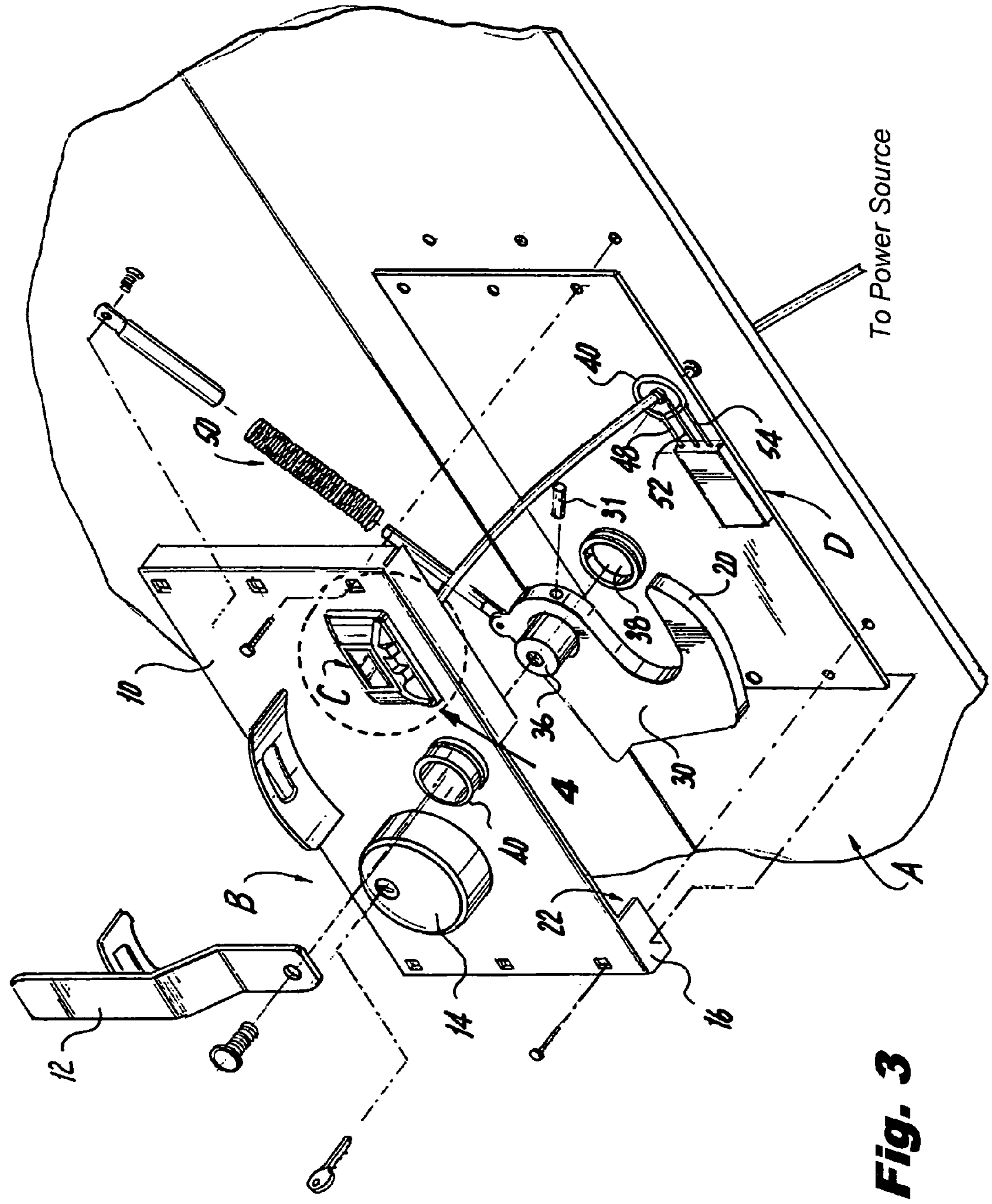
FIG. 3 is an exploded isometric view of the vehicle cargo door lock mechanism.

The present invention is designed for use with any type of vehicle that has an enclosed cargo area which can be secured. However, the present invention is primarily intended for use for securing cargo on trucks moving from one location to another location. Accordingly, the invention is disclosed herein as it would be used on a truck with an enclosed cargo area secured by a roll-up cargo door having a cargo door lock with a J-hook that engages a member situated in the jam at the edge of the cargo area. However, it is to be understood that the invention could be easily adapted by one skilled in the art for use with other types of vehicles, with vehicles with other types of cargo doors or with cargo doors with other types of locks.

Further, the sensor that senses whether the cargo area may have been accessed during transit may take the form of any type of cargo door position sensor capable of sensing the opening of the cargo door or any type of sensor capable of sensing the state of the lock, and hence when the lock is unlocked.

When the door position is sensed, the digital counter display may be mounted anywhere on the exterior of truck, but preferably is situated on the cargo door itself, with the sensor mounted on the interior surface of the cargo door adjacent the bottom or side edge of the door. When the lock state sensor is utilized, the counter display is preferably mounted on the exterior of the lock enclosure, with the sensor situated inside the lock enclosure. Further, it is preferable that the counter display be situated in a position where it can be easily observed by a person opening the cargo door.

For security purposes, it is best to mount the sensor in a position where any slight opening of the cargo door or movement of the lock mechanism would be sensed immediately and where the sensor can not be accessed or tampered with. For that reason, it is preferable to mount the sensor inside the enclosure of the cargo door lock where it is protected in the same way as the lock mechanism or inside the cargo door where it cannot be accessed without opening the door.

In its preferred form, the sensor is a magnetic reed switch. When mounted inside the lock enclosure, the sensor is preferably situated proximate the path of movement of the latch, which is a massive metal part which will function to interact magnetically with the sensor, such that when the cargo door lock handle is moved toward the unlocked position, the magnetic switch will be actuated.

When the magnetic switch is mounted on the interior surface of the door, it is preferable to locate the switch adjacent the bottom edge of the door so that the switch will be close to the metal door jam into which the J-hook of the cargo lock is received when the door is closed. In that way, the metal edge of the floor will interact with the switch such that the state of the switch is determined by the proximity of the metal jam. Thus, as soon as the door moves away from the metal jam, the switch will change state. That will cause the digital counter to be indexed, that is, actuated to change the number on the counter display.

Wherever the switch is situated, it is preferable to mount the digital counter display in a manner so that the wires leading from the switch to the counter are not exposed. Further, the counter display should be situated within a weatherproof enclosure.

The switch and digital counter display of the system of the present invention will operate successfully with any type of cargo door lock. However, for purposes of illustration, the system of the present invention is disclosed as it would be used on a cargo door with a cargo door lock such as the lock that is the subject of U.S. Pat. No. 7,066,500, issued to Greg Haber on Jun. 27, 2006 and entitled: “Vehicle Door Lock”, which patent is hereby incorporated herein by reference. However, it should be understood that the particular door lock mechanism described below is not meant as a limitation of the invention and that the system of the present invention can be used on any cargo door lock that has a movable part capable of actuating a switch as the lock changes state from the locked state to the unlocked state.

FIG. 1 illustrates a first preferred embodiment of the present invention, one in which the security system components are part of the cargo door lock. This drawing shows the exterior of the rear of a truck and particularly, the roll-up cargo door, generally designated A, with the cargo door lock, generally designated B, mounted thereon. Visible on the exterior surface of enclosure 10 of lock B are the rotatable handle 12 used to move the J-hook between locked and unlocked positions, the circular lock cylinder housing 14 and the digital computer display of the present invention, generally designated C.

As seen in the figures, lock enclosure 10 has a front wall, from which top, side walls and a bottom wall 16, extend rearward, and a rear wall. The bottom wall 16 of the enclosure faces the metal door jam 18 of the vehicle. Bottom wall 16 has an opening 22 through wall the J-hook 20 of the lock extends.

Lock enclosure B is fabricated of strong, heavy metal and is designed to be mounted on the exterior surface of the vehicle door A by means of a plurality of smooth headed bolts (FIG. 3). The bolts extend though openings in front wall of the enclosure, openings in housing rear wall and through vehicle door such that the nuts for those bolts are not accessible from the exterior of the door.

Inside the lock enclosure is a rotatable latch 30 includes a metal body and an integral J-hook 20. The latch body is mounted on a large diameter shaft 36 and fixed thereto by a large metal set screw 31. Shaft 36 is rotatably received at its rear within opening 38 in housing rear wall and at its front by opening 40 in the front wall of the enclosure. Opening 40 is defined by a collar extending from the surface of the enclosure front wall.

Figure 5:
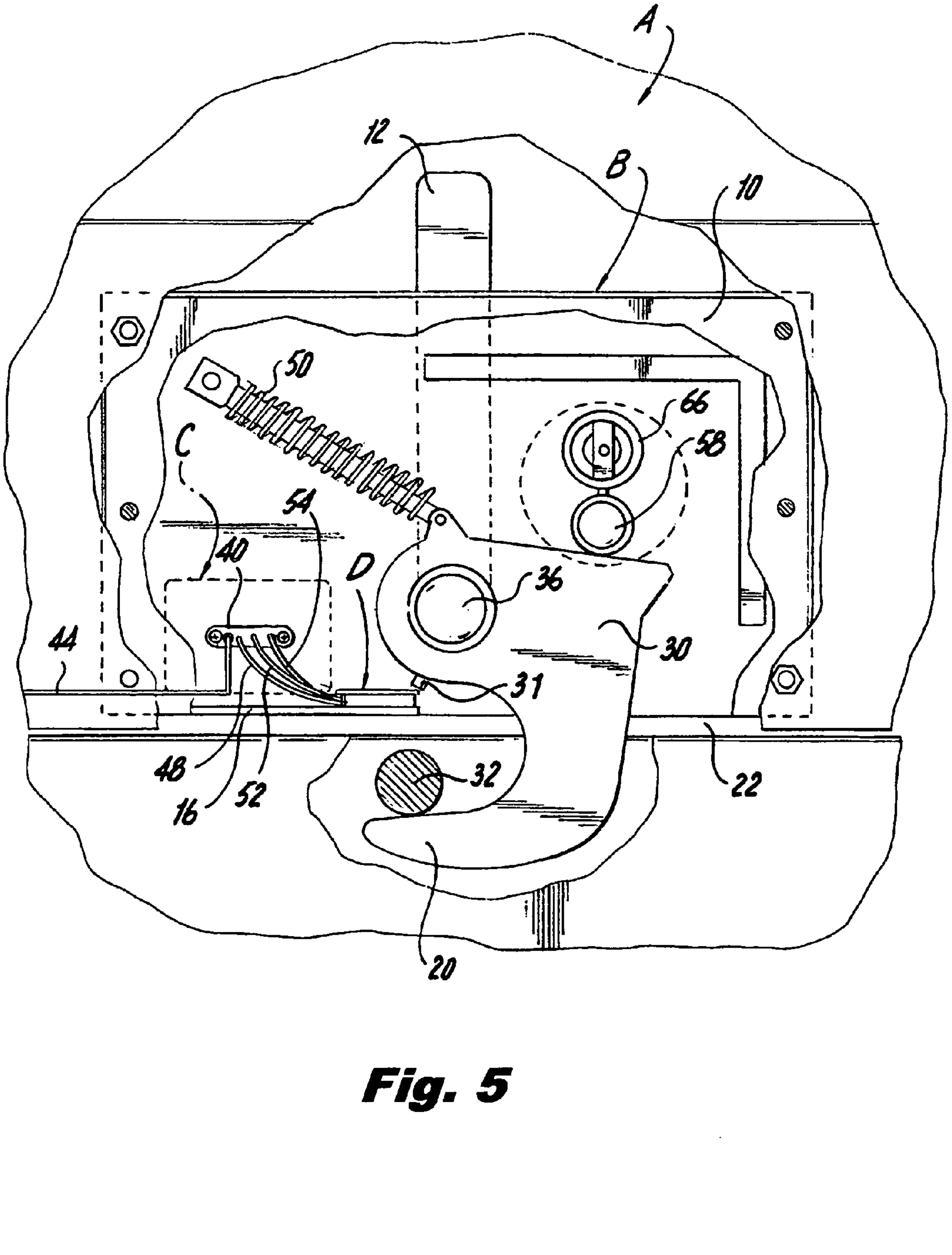
FIG. 5 is an elevation rear view of the interior of the vehicle cargo door lock, showing the lock with the J-hook in the locked position.
Figure 6:
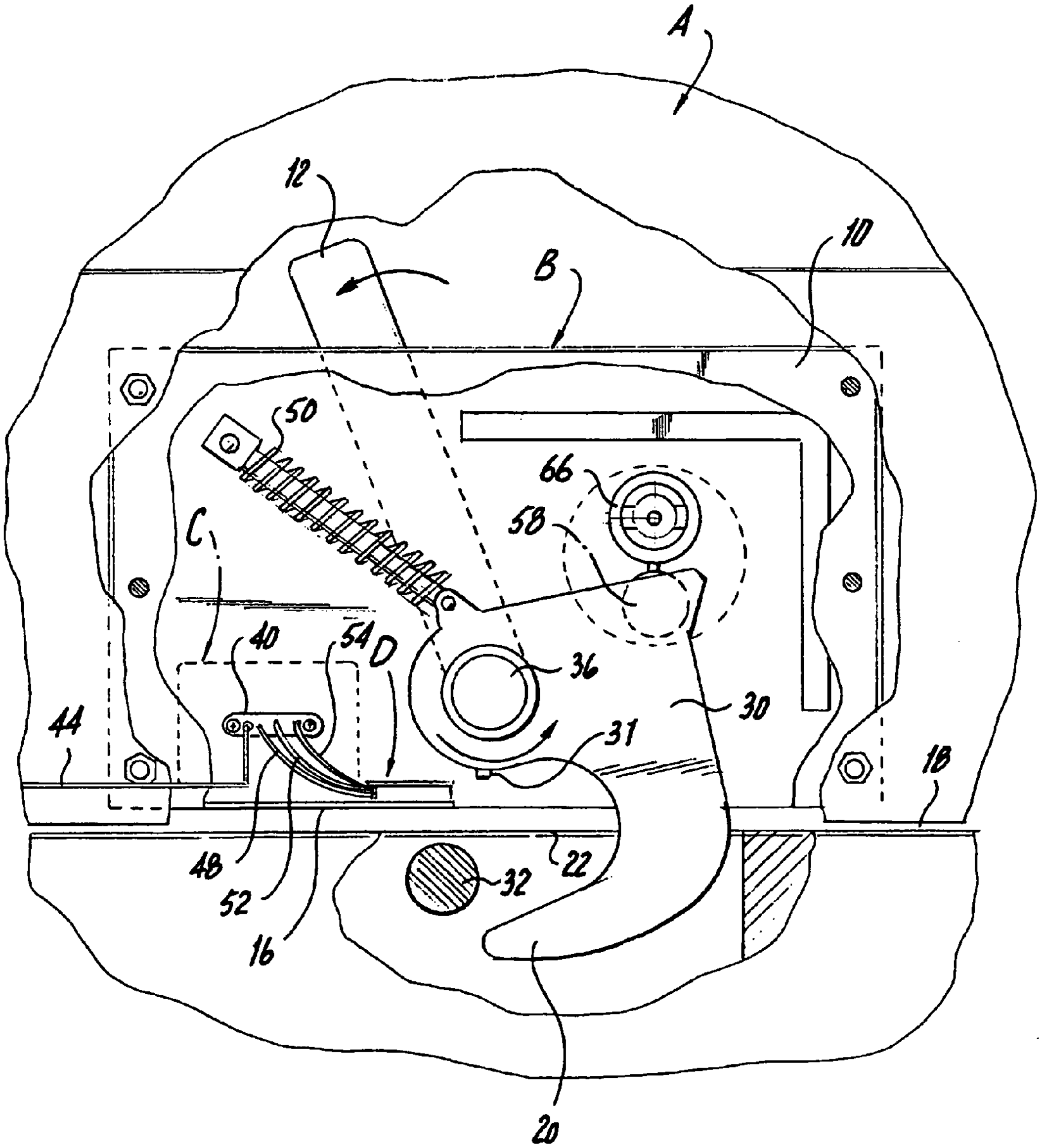
FIG. 6 is an elevation rear view of the interior of the vehicle cargo door lock, showing the lock with the J-hook in the unlocked position.

Handle 12 is fixed to the front surface of shaft 36. Shaft 36, and hence the latch body, rotate about an axis defined by shaft 36. FIGS. 5 and 6 show the lock interior viewed from the rear. As seen in those figures, the latch body rotates in a clockwise direction as handle 12 is moved through an arc from a vertical position, where hook 20 engages part 32 in the vehicle door jam 18 and locks the door (FIG. 5), to a position where hook 20 is remote and disengaged from vehicle part 32 (FIG. 6), so as to unlock door A so that the door can be moved upwardly away from the door jam, to access the cargo area behind the door.

A spring 50 is pivotally connected between the latch body and the front wall of the enclosure Spring 50 biases the latch body towards the disengaged position of hook 20.

A latch rotation preventing member 58 is provided. Member 58 is moveable linearly in a direction substantially parallel to the latch rotation axis defined by shaft 36. Member 58 moves along its axis, between a forward position, where it is remote from the rotational path of the latch body, and a rear position, where it intersects the rotational path of the latch body. In the rear position of member 58, the member abuts the side surface of the latch body to prevent the latch body from moving hook 20 to disengage vehicle part 32. A spring (not shown) biases member 58 toward its rear position.

Member 58 is connected to a lock cylinder 66 situated within housing 14. Housing 14 is fabricated of strong, heavy metal, like the remainder of the lock enclosure, and is welded to the exterior surface of enclosure front wall.

Cylinder 66 is rotated by a key. As cylinder 66 rotates, member 58 is caused to move back and forth along its axis. When cylinder 66 is in the “locked” position, the internal spring moves member 58 linearly to its rear position, intersecting the path of the latch body, preventing the latch body from rotating to cause hook 20 to disengage vehicle part 32 see FIG. 5. When cylinder 66 rotates from its “locked” position, member 58 is caused to move to its forward position, against the urging of the internal spring, and member 58 is caused to move out of the path of the latch body, permitting the latch body to rotate and hook 20 to disengage vehicle part 32, see FIG. 6.

Figure 4:
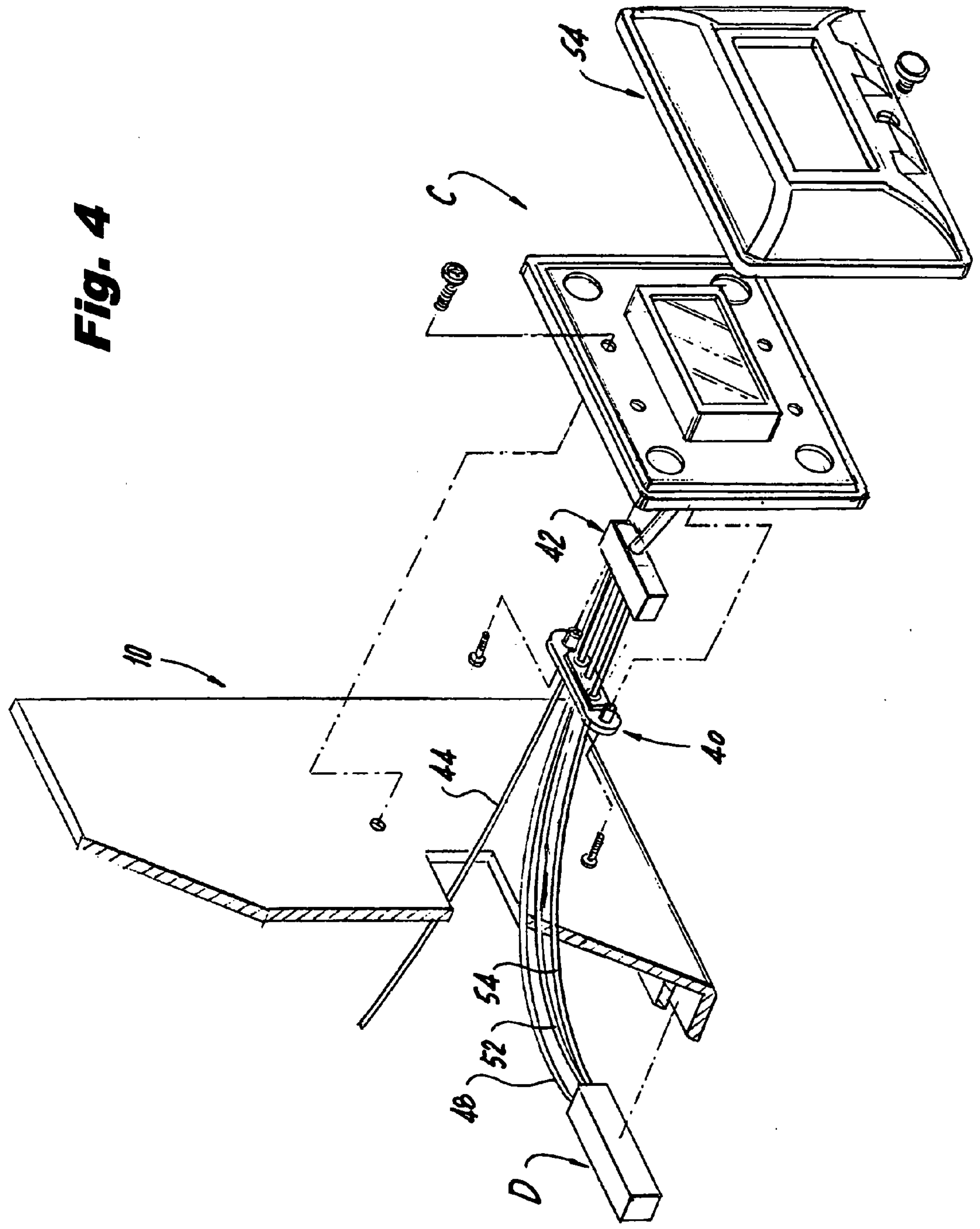
FIG. 4 is an exploded isometric view of the counter display unit and the magnetic door sensor position switch.

Turning now to FIG. 4, illustrated in that figure is a portion of the front wall of lock enclosure 10 to which the digital counter display C is mounted by screws. The rear of display C is connected by connector 42 to cable holder 40 which in turn is connected to a power source (not shown) by wire 44 and to a magnetic reed switch, generally designated D, by wires 48 and 52.

The system has a three wire hook up for the external reed switch D. That hoop up allows the system to use either N/O or N/C (normally open or normally closed) circuits.

Switch D is mounted inside the lock enclosure, preferably behind the portion on the front wall of the lock enclosure the counter display is mounted, on the interior surface of the bottom wall 16 of the lock enclosure when latch 30 and pin 31 are in the "locked position, the magnet in switch D is attracted by the latch and pin and the switch D is in a first state. However, when the latch and pin are moved toward the unlocked position, the state of switch changes, causing the counter to be indexed and the number displayed by the counter to be changed.

Thus, time latch 30 is rotated from its locked position (FIG. 5) to its unlocked position (FIG. 6) switch D senses the movement of latch 30 and pin 31 and hence the cargo door lock has been unlocked. That actuates the switch to change state and to cause the counter to be indexed, that is, change the number on the counter display.

Figure 7:
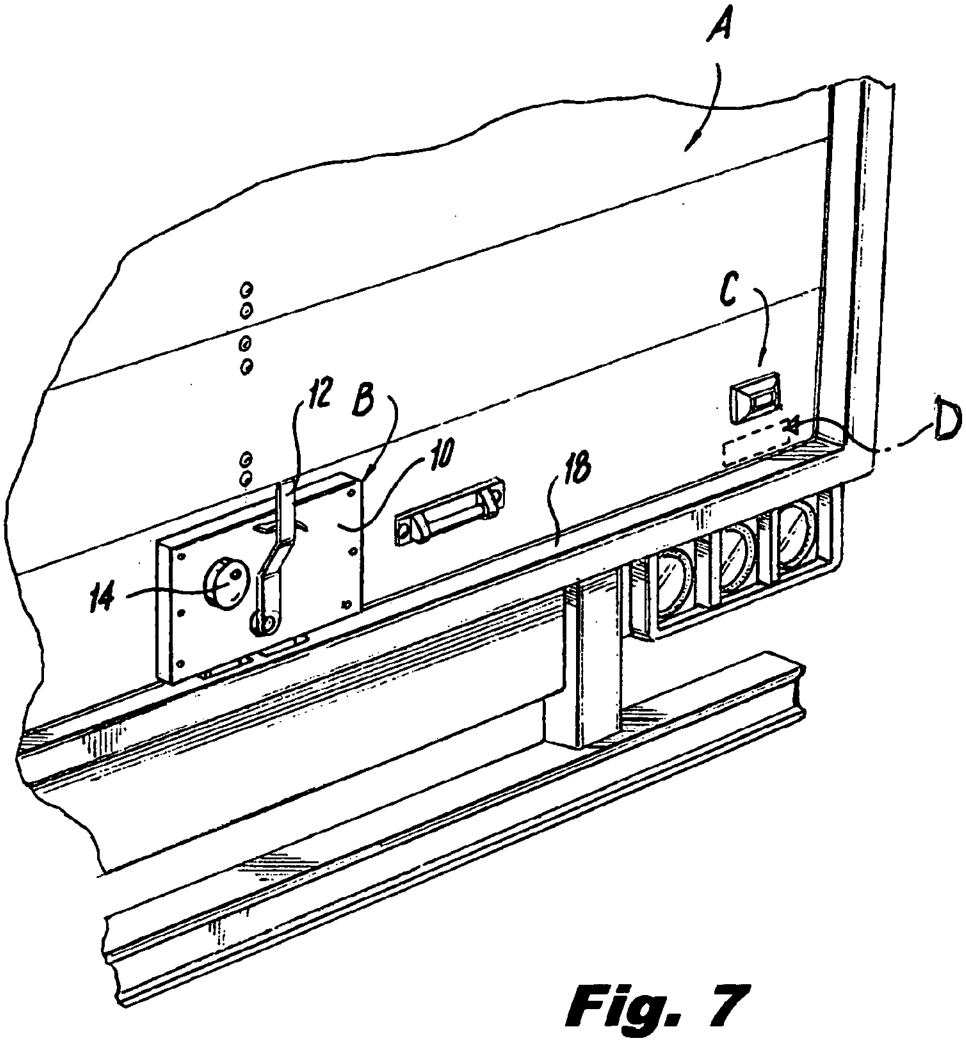
FIG. 7 is a partial view of the exterior of a vehicle cargo door showing the display unit mounted on the exterior of the vehicle cargo door.

The second preferred embodiment of the present invention is illustrated in FIG. 7. As seen in that figure, switch D is mounted on the interior wall of door A, adjacent the bottom edge of the door. Thus, when door A is closed, switch D is situated immediately adjacent metal door jam 18. Metal door jam 18 interacts with switch D such that when door A is opened, the switch changes state, cause the counter to be indexed such that the number on the counter is changed.

In this embodiment, counter display C is mounted on the exterior surface of door A. In all other respects, the system is the same as that described in the first preferred embodiment.

The operation of the security system is simple. When the cargo door lock is in the unlocked state (first preferred embodiment) or the cargo door is open (second preferred embodiment), the display will read "OPEN." After the cargo door lock is locked or the cargo door is closed, so as to secure the cargo area, the counter will be set to display a four digit number. That will take place when the button on the front of the display is depressed.

The four digit number may be any number, such as a random number provided by a random number generator. Alternatively, the set number can be provided manually by depressing the button on the display repeatedly.

The set number on the display will not change until switch D senses that the cargo area may have been accessed, such as by unlocking the cargo door lock or by opening the cargo door again. The set number will not be in a normal sequence. Preferably, a log or a record of opening, with a date stamp that can be retrieved, may be provided.

Display C should display low battery before the battery is depleted to offer a warning to replace before the unit fails.

The set number on the counter will be provided to the recipient of the cargo by the shipper. That can be accomplished either by entering the number set on the counter on the shipping documents which accompany the vehicle to the destination or which travel to the recipient separately from the vehicle.

Instead, the set number can be forwarded to the recipient electronically, via fax, by e-mail through the Internet, by a wireless device or by any other means. For example, the system can be attached to a wireless RF device or a GPS device to transmit the set number, change in set number and history of use The counter display is designed to be very rugged. It has a Zinc aluminum exterior 54 that can withstand extreme weather and other harsh conditions that a truck would encounter.

When the truck reaches its destination, the recipient of the cargo will read the counter number from the display and then compare that number with the set number forwarded by the shipper. If the number displayed on the counter is the same as the number set at the loading site after the cargo area was secured and transmitted to the recipient by the shipper, the recipient knows that the cargo area has not been accessed during transit and the cargo has not been tampered with. If any other number appears on the display, the recipient knows that the cargo area may have been accessed and not to accept the cargo or at least to inspect the cargo carefully before accepting it.

Figure 8:
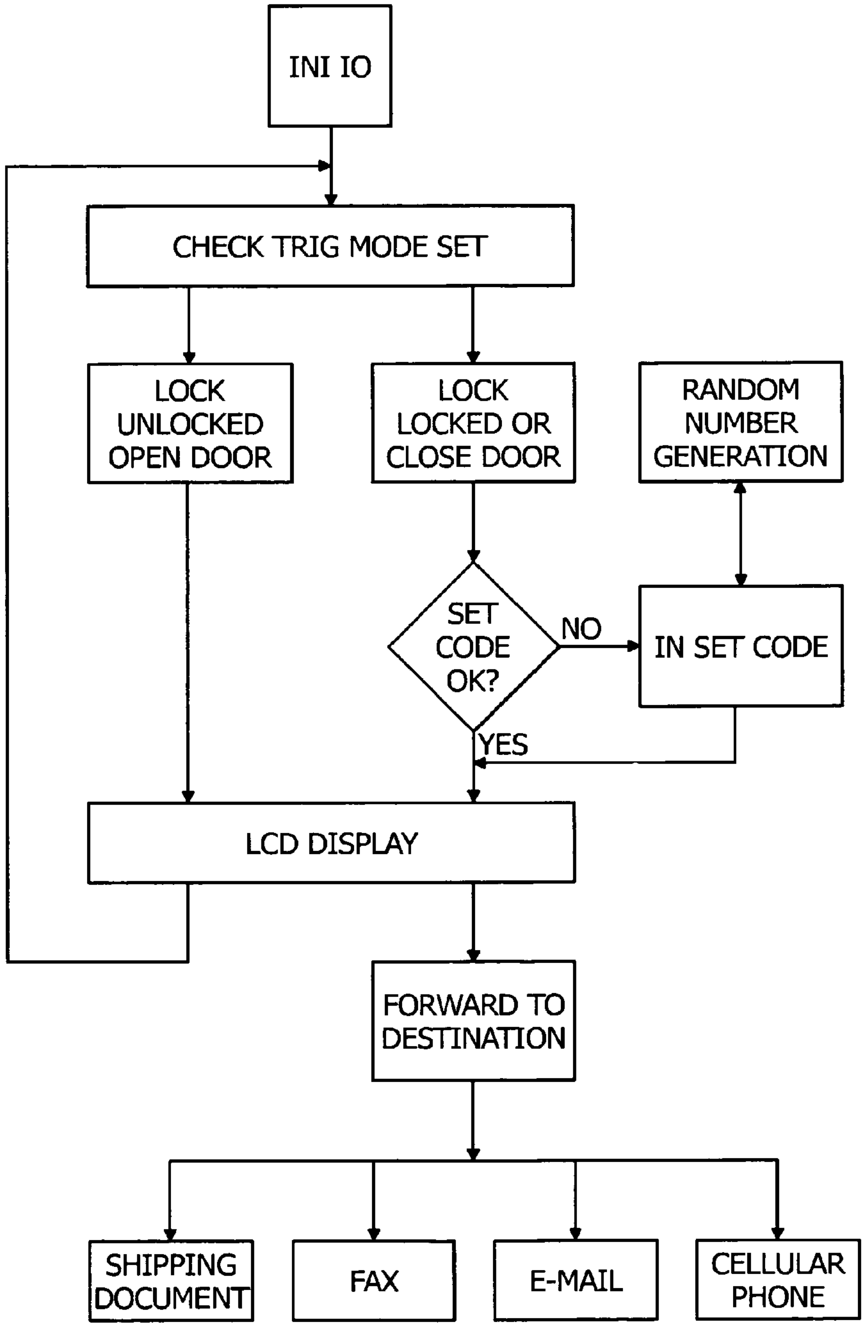
FIG. 8 is a flow diagram of the software for the operation of the system of the present invention.

FIG. 8 is a flow chart of the system operation. The first box in the flow chart labeled "INI I/O" represents the initiation of the operation of the system. The box labeled "CHECK TRIG. MODE SET" indicates that the system checks to see if it is connected to a closed loop type or open-loop type read switch. Based on that, the system determines if the truck cargo door is locked or unlocked (first preferred embodiment) or the cargo door is open or closed (second preferred embodiment). If the lock is unlocked or the cargo door is open, the LCD display reads "OPEN".

If the cargo area is secured, that is, the lock is locked or the door is closed, the system checks to see if the code number has been set in the counter. If not, the number is provided manually, by a random number generator or other means and the set number is then displayed by the counter display. That set number will remain in the counter memory until switch D senses that the cargo door lock is unlocked or the cargo door is opened again, at which time the number on the display will change, indicating that the cargo area may have been accessed.

It will now be appreciated that the present invention relates to a vehicle cargo security system that functions like an electronic substitute for the conventional plastic or metal physical seal but which does not attach to the J-hook of the lock and hence does not interfere with the operation of the cargo door. The system includes a sensor that detects the unlocking of the cargo door lock or the opening of the cargo door and in response, changes the number displayed on a digital counter. The number set on the counter after the cargo area of the vehicle has been secured is forwarded to the recipient of the cargo who, upon the arrival of the vehicle at the cargo destination, observes the number on the counter display and compares that number with the set number. If the numbers match, the recipient knows that the cargo area has not been accessed in transit and hence the cargo has not been tampered with during shipment.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims:

I claim:

1. A method for determining if the enclosed cargo area of a vehicle has been accessed during transit between a first location and a second location, the vehicle having an enclosed cargo area which can be secured to prevent access thereto and having a digital counter with a display, means for setting the number on the counter, means for sensing whether the cargo area has been accessed and for changing the number on the counter in response thereto, the method comprising the steps of:

(a) Loading cargo into the vehicle cargo area with the vehicle at the first location, (b) Securing the cargo area of the vehicle;

(c) Setting the number on the counter after the cargo area has been secured;

(d) Forwarding the set number to the second location by means separate from the vehicle;

(e) Changing the number on the counter if the cargo area has been accessed;

(f) Moving the vehicle to the second location;

(g) Observing the number on the display when the vehicle reaches the second location;

(h) Comparing the forwarded number and the observed number; and (i) Determining whether the forwarded number and the observed number are the same or different.

2. The method of claim 1 wherein the vehicle has a cargo door which can be closed to secure the cargo area and wherein the step of securing the cargo area comprises the step of closing the cargo door.

3. The method of claim 2 wherein the step of changing the number on the counter comprises the step of sensing the opening of the cargo door and changing the number on the counter display in response thereto.

4. The method of claim 1 wherein the vehicle has a cargo door with a lock which can be locked to secure the cargo area and wherein the step of securing the cargo area comprises the step of locking the cargo door lock.

5. The method of claim 4 wherein the step of changing the number on the counter comprises the step of sensing the unlocking of the cargo door lock and changing the number on the counter display in response thereto.

6. The method of claim 1 wherein the step of forwarding the set number comprises the step of entering the set number on the shipping documents.

7. The method of claim 6 wherein the shipping documents with the entered number are sent to the second location separately from the vehicle.

8. The method of claim 1 wherein the step of forwarding the set number comprises the step of transmitting the set number to the second location electronically.

9. The method of claim 8 wherein the step of electronically transmitting the set number comprises the step of transmitting the set number to the second location via the Internet.

10. The method of claim 8 wherein the step of electronically transmitting the set number comprises the step of transmitting the set number to the second location by a wireless communications device.

11. The method of claim 1 further comprising the step of fixing the display to the exterior of the vehicle.

12. The method of claim 1 wherein the step of setting the number comprises the step of generating a random number.

13. Apparatus for determining if a cargo area of a vehicle has been accessed during transit between a first location and a second location, the vehicle having an enclosed cargo area that can be secured, the apparatus comprising: a digital counter having a display; means for setting the number on the counter after the cargo area is secured; means for sensing whether the cargo area has been accessed after the cargo area is secured and for changing the number on the counter in response thereto; and means separate from the vehicle for forwarding the number set on the counter display to the second location, so that it can be determined at the second location if the cargo area has been accessed in transit by comparing the set number and the number displayed on the counter when the vehicle reaches the second location.

14. The apparatus of claim 13 wherein the vehicle has a cargo door which can be closed to secure the cargo area.

15. The method of claim 14 further comprising means for sensing whether the cargo door has been opened and for changing the number on the counter in response thereto.

16. The method of claim 13 wherein the vehicle has a cargo door with a lock which may be locked to secure the cargo area.

17. The method of claim 16 further comprising means for sensing whether said lock has been unlocked and for changing the number on the counter in response thereto.

18. The apparatus of claim 16 wherein said sensing means comprises a magnetic switch.

19. The apparatus of claim 18 wherein said cargo door lock has an enclosure and wherein said magnetic switch is situated within lock enclosure.

20. The apparatus of claim 19 wherein said counter display is situated on the exterior of said lock enclosure.

21. The apparatus of claim 13 wherein said forwarding means comprises shipping documents with the set number entered thereon.

22. The apparatus of claim 13 wherein said forwarding means comprises means for transmitting the set number to the second location electronically.

23. The apparatus of claim 22 wherein said electronic transmitting means comprises means for forwarding the set number to the second location via the Internet.

24. The apparatus of claim 22 wherein said electronic transmitting means comprises means for forwarding the set number to the second location via a wireless device.

25. The apparatus of claim 13 further comprising means for fixing said counter display to the exterior of the vehicle.

26. The apparatus of claim 13 further comprising means for enclosing said counter display in a weatherproof enclosure.

27. The apparatus of claim 13 wherein said sensing means comprises a switch.

* * * * *